United States Patent
Mack et al.

[11] 3,924,100
[45] Dec. 2, 1975

[54] MOBILE FOOD SERVING SYSTEM

[76] Inventors: Anthony C. Mack, 13 Hillview Road, North Reading, Mass. 01864; George K. Shumrak, 17 Fox Hill Drive, Natick, Mass. 01760

[22] Filed: May 9, 1974

[21] Appl. No.: 468,404

[52] U.S. Cl. ............... 219/386; 219/218; 219/403; 219/521; 312/236
[51] Int. Cl.² .......................................... F27D 11/02
[58] Field of Search .......... 219/201, 214, 218, 385, 219/386, 387, 400, 403, 404, 521, 523; 312/214, 236; 99/328, 447; 426/107

[56] References Cited
UNITED STATES PATENTS

| | | | |
|---|---|---|---|
| 1,731,949 | 10/1929 | Span et al. | 219/218 |
| 2,078,650 | 4/1937 | Clark | 219/387 |
| 2,196,035 | 4/1940 | Shaw | 219/386 X |
| 2,548,932 | 4/1951 | Ball | 219/218 |
| 2,662,966 | 12/1953 | Bruchhausen | 219/218 X |
| 3,275,393 | 9/1966 | Stantz et al. | 312/214 |
| 3,482,078 | 12/1969 | Milne | 219/387 |
| 3,674,982 | 7/1972 | Hoyt et al. | 219/403 |
| 3,725,645 | 4/1973 | Shevlin | 219/521 |
| 3,751,629 | 8/1973 | Eisler | 219/385 X |
| 3,814,900 | 6/1974 | Frey et al. | 219/385 |

*Primary Examiner*—Volodymyr Y. Mayewsky
*Attorney, Agent, or Firm*—Wolf, Greenfield & Sacks

[57] ABSTRACT

A food serving system for delivering prepared meals to locations remote from the point of preparation, such as to patients in hospitals and nursing homes, which includes a mobile cart having its own low voltage rechargeable power pack that may be utilized to make the cart self powered. The cart has a tier of racks for carrying removable, generally flat, individual, food serving trays. The trays may be disposable or reusable. Each tray is provided with one or more thermally isolated heat transfer devices which may be energized when the tray is placed on a rack in the cart. The trays are constructed to carry conventionally styled, removable dishes, bowls, cups, etc., that may be either disposable or reusable, and the dishes and bowls containing foods to be maintained at a reduced or elevated temperature are placed on the heat transfer devices. The heat transfer devices are intended to maintain the food in the dishes and bowls at the desired serving temperature for extended periods without affecting the temperature of the foods and beverages in other dishes, bowls and cups on the trays, so that when the cart is moved about the hospital they remain at their desired temperatures and the individual trays may be brought to the patients with the different foods and beverages at their separate selected temperatures.

23 Claims, 10 Drawing Figures

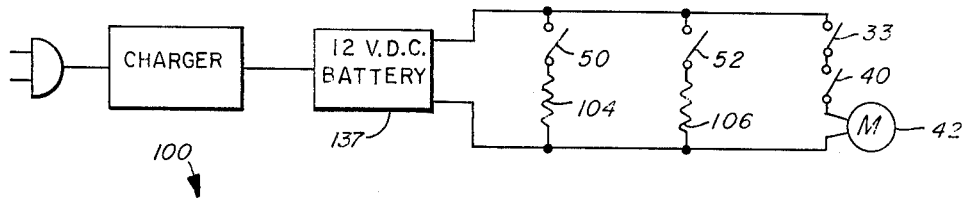
FIG. 10
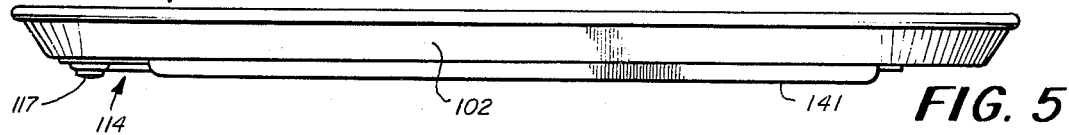
FIG. 5
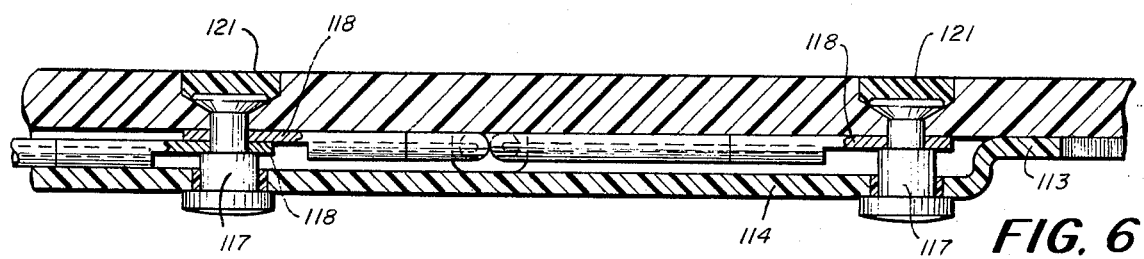
FIG. 6
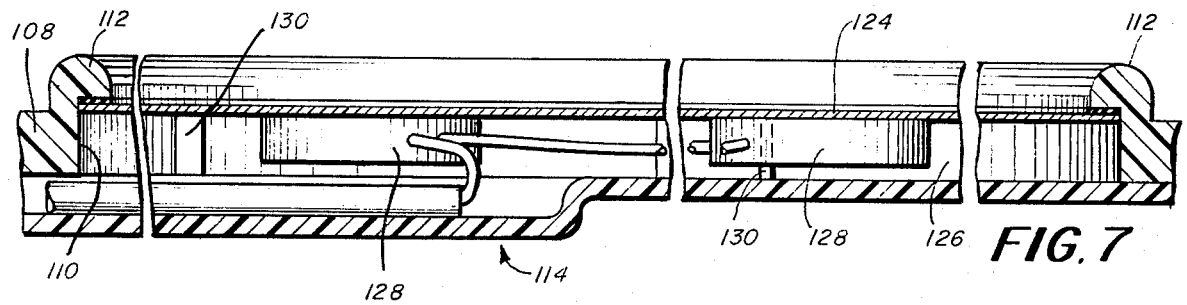
FIG. 7
FIG. 8
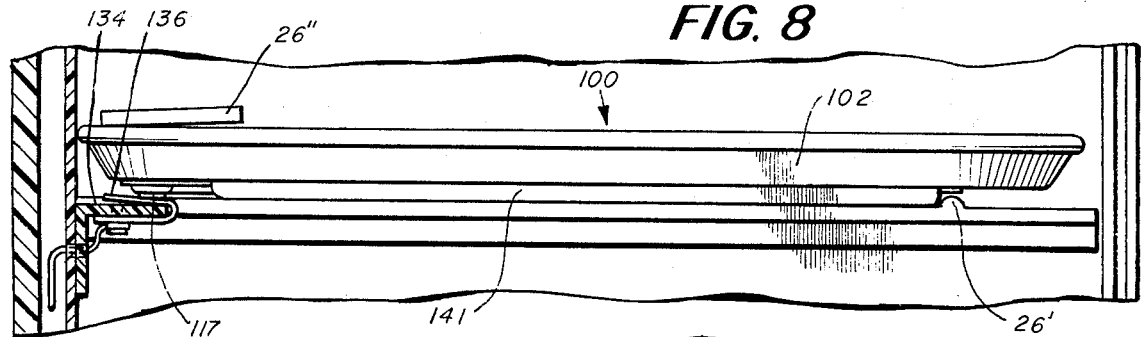
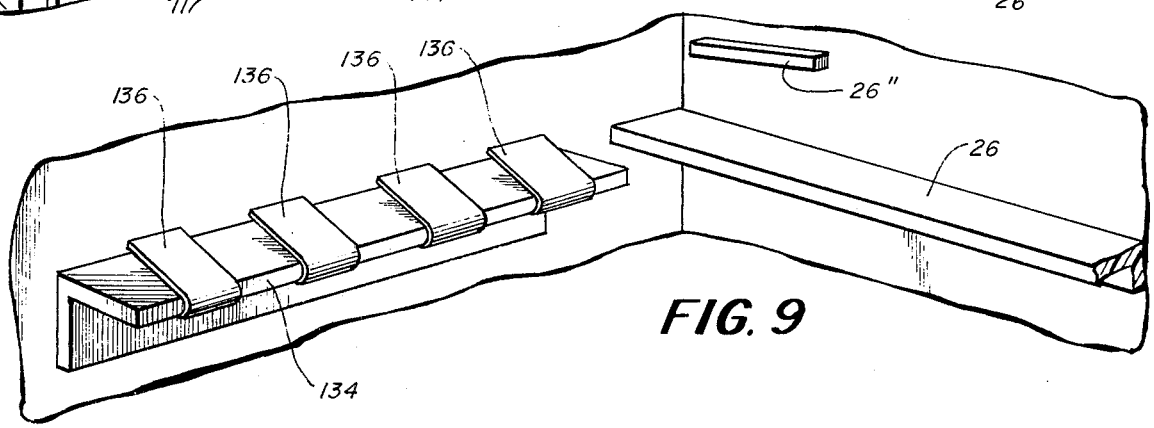
FIG. 9

3,924,100

MOBILE FOOD SERVING SYSTEM

INTRODUCTION

This invention relates to the delivery of prepared meals to locations remote from the point of preparation and more particularly comprises a new concept in the feeding of patients in hospitals, nursing homes and other institutions, the feeding of hotel guests in their rooms etc. In the following description the invention is described in terms of its use in a hospital but it is to be borne in mind that the invention has wider applications.

Hospitals use a variety of different systems for serving meals to their patients. These systems generally fall into two categories, frequently identified as centralized and decentralized systems. And the systems in each category include a variety of different techniques intended to bring food to the individual patients at the desired temperature.

In the centralized systems, the food is prepared in a main kitchen where the entire meal is set up on individual patient's trays, and the trays are transported directly to the patients. The heated pellet system, hot and cold cart system, and insulated nestable tray - thermal column system all are categorized in the centralized system of food distribution.

The decentralized systems generally fall into two categories, namely, conventional and microwave systems. In conventional decentralized systems, the food is prepared in central kitchens and transported in bulk to floor pantries on the different hospital floors where the patients' trays are assembled. In the microwave systems, the prepared food is either kept in a freezer or refrigerator, and just prior to its serving, the food is allowed to thaw and is then heated in a microwave oven in the floor pantry. Thereafter it is promptly delivered to the patient.

All of the various centralized and decentralized systems have disadvantages. For example, the pellet systems employ a metal disc preheated to 250°–450°F. as the heat source in the tray to maintain hot food at desired temperature, and the pellets constitute a hazard to the patient and kitchen personnel. If the pellets are overheated, they cause the foods to overcook or dry out. The effective temperature retention time is limited to approximately 45 minutes. And the pellets are heavy and add substantial weight to trays. In hot and cold cart systems, wherein the carts for the trays have separate hot and cold sections, there is a tendency to overcook and dry out the foods in the hot section. Utility outlets are needed in both the kitchen and on the patients' floors, and the carts normally are on current for 7 or 8 hours daily. And they do not generate heat in transit. The carts are difficult to clean and require substantial maintenance, and the carts are costly, heavy and have limited tray capacity. In insulated tray-thermal column systems wherein the trays nest on top of one another so that all the hot foods stack on top of each other and similarly all the cold foods stack on top of one another to form thermal columns, the trays are bulky, heat is conducted in the tray skins from the hot to the cold columns, and the systems have a limited temperature retention time. Furthermore, without lids on the separate trays, the tray bottoms become soiled from the food in the next lower trays.

In the decentralized systems, labor costs are relatively high as more people are required to operate the systems, food costs are higher because of waste and unauthorized consumption, food odors are created on separate floors because of the floor pantries, and dishwashing noise is created on the floors when china is used.

One important object of this invention is to upgrade the quality of food service. This object is accomplished first by providing a system wherein the food is served at the intended temperature even though the food may have left the point of preparation an extended period of time before it is actually delivered to the patients. Second, the eating experience is enhanced by providing a system wherein the patient is served his food conventionally in separate dishes and bowls rather than in large partitioned unattractive and essentially impersonal trays. In essence the object of this invention is to make the eating experience of patients in institutions as enjoyable as possible. This is in part the result of the wider range of foods available to the hospital (they need not avoid quick cooling food) and the elimination of overheating which destroys both the taste and nutritional value of the food.

To accomplish these and other objects, this invention includes among its features a self-contained mobile cart, separate removable food serving trays for each patient, and individual dishes, plates, bowls, etc. to be carried on the trays and which may be like those used in the home. The cart carries its own rechargeable low voltage power pack, which is designed to supply the necessary energy to each tray to maintain selected portions of the trays that in turn support the dishes containing foods at other than ambient temperature at the desired temperature. The trays include isolated heater transfer devices which comprise a relatively small percentage of the total tray area, and those portions are sized so as to correspond to the size of the dishes containing the foods to be heated or cooled by them. The heat transfer devices do not affect the temperature of the remainder of the tray, and consequently foods not actually on the transfer devices remain at their initial temperatures.

Each tray carries its own contacts that engage terminals on the cart so that the trays and particularly their heater transfer devices may automatically be energized when the trays are mounted on the racks. Preferably the separate dishes, plates, and bowls are disposable, and they have the ability to conduct heat between the heat transfer devices and the foods contained in them. When the transfer devices are heaters, the containers must have sufficient stability so as to be capable of being subjected for extended periods to the heat of the heaters without burning or distorting. In order to maximize the efficiency of the heaters, those plates and bowls which are intended to carry hot foods are provided with covers to reduce the heat loss.

These and other objects and features of this invention will be better understood and appreciated from the following detailed description of several embodiments of the food system of this invention, read in connection with the accompanying drawings.

BRIEF FIGURE DESCRIPTION

FIG. 5 is a side elevation of the tray of FIGS. 3 and 4.

Figure 3:
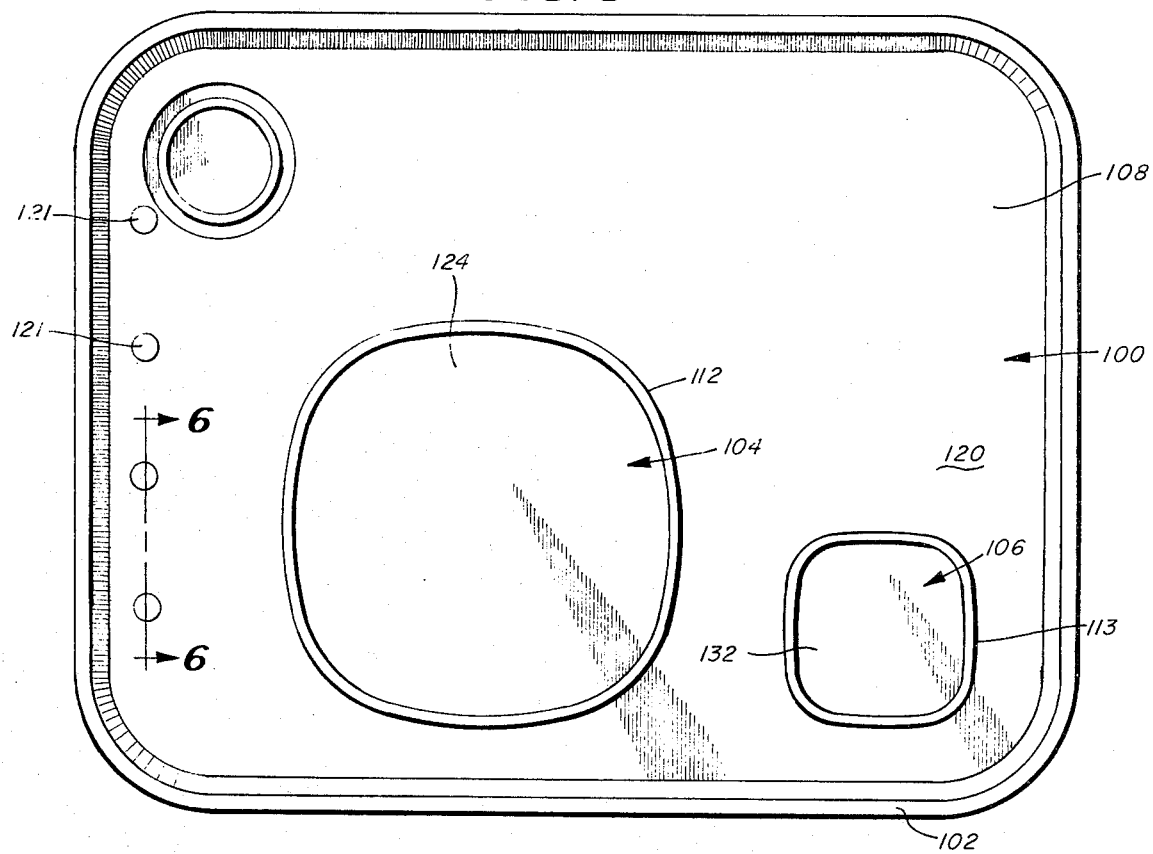
FIG. 3 is a top plan view of a tray constructed in accordance with this invention.
Figure 4:
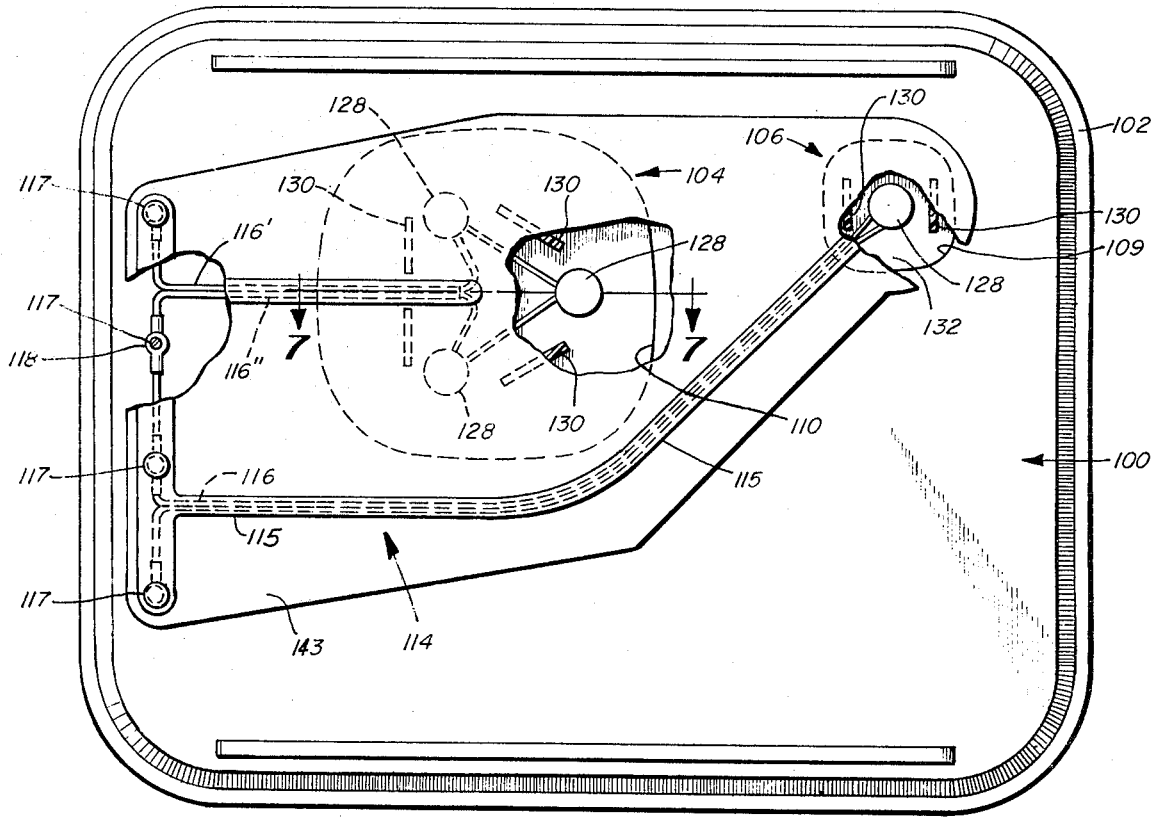
FIG. 4 is a bottom plan view of the tray of FIG. 3 with parts broken away to reveal details of the tray construction.

FIGS. 6 and 7 are cross sectional views of the tray taken along section lines 6—6 and 7—7 of FIGS. 3 and 4 respectively.

Figure 1:
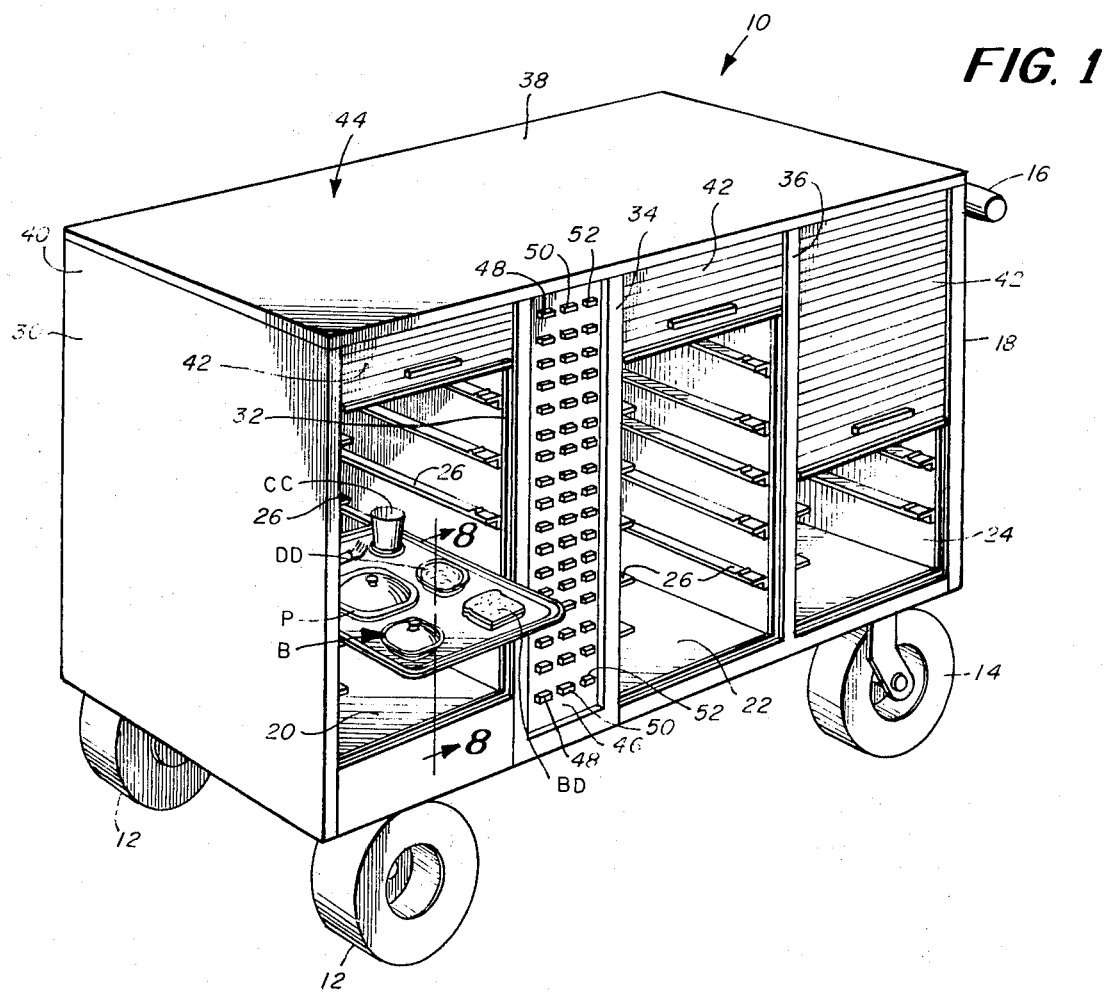
FIG. 1 is a perspective view of a cart and tray of this invention and showing one of a number of food trays that are carried by the cart, partially inserted on its rack.

FIG. 8 is a fragmentary cross-sectional view showing how a tray makes electrical contact with the cart and with the tray fully inserted in the cart and taken along section line 8—8 of FIG. 1.

FIG. 9 is a fragmentary perspective view of the inside of the cart showing the electrical contacts of one rack.

FIG. 10 is a simplified circuit diagram of the electrical components of the cart and tray.

DETAILED DESCRIPTION

In FIG. 1, a single cart 10 is shown, which is designed to move about the floor of the facility employing the feeding system of this invention. The cart illustrated has a pair of fixed axle wheels 12 and a pair of pivotally supported wheels 14 to enable the cart to move freely in any direction. A pair of handles 16 are provided at the top of end panel 18 of the cart for the convenience of the operator.

The cart illustrated is shown to have three separate tray compartments 20, 22 and 24, each subdivided by angles 26 that define separate tiers for the trays to be carried in them. The separate compartments are collectively defined by the bottom wall 28, end panels 18 and 30, partitions 32, 34 and 36, top wall 38, rear panel 40 and sliding doors 42.

A power pack and control circuit section 44 forms part of the cart and is mounted between partitions 32 and 34. The power pack and control circuit contained in the section is designed first to supply the energy needed to energize the spot heat transfer devices on the several trays which may be carried in the tiers within the compartments 20, 22 and 24, and it may serve the additional function of supplying energy to literally drive the cart about the floor. And such an arrangement would of course include means for recharging the power pack from an AC power source. The details of the power pack and control circuit are not part of the present invention.

Figure 2:
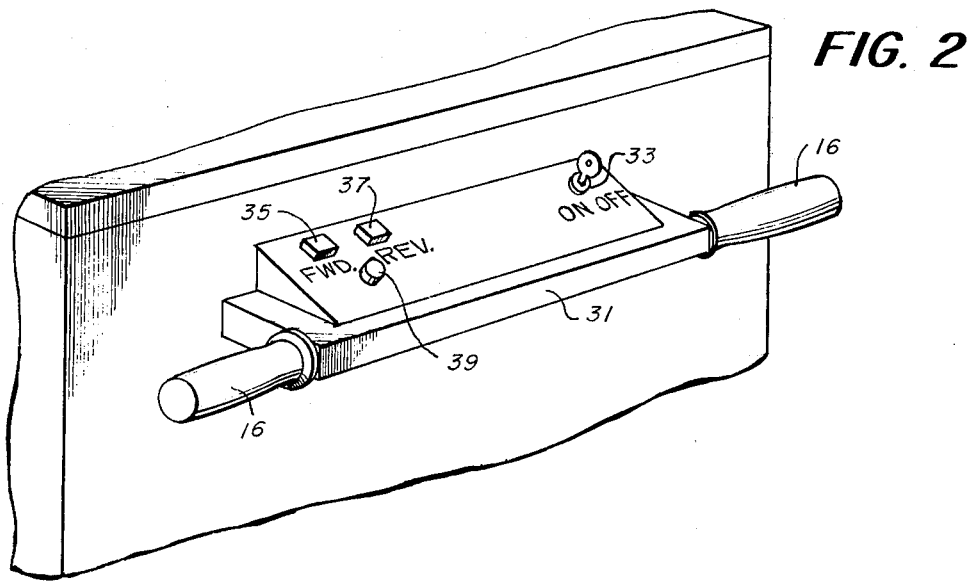
FIG. 2 is a fragmentary perspective view of the cart operating controls.

In FIG. 2 the controls for driving the cart are suggested. The console 31 between handles 16 has a key operated switch 33 for connecting the power pack to the motor 42' (see FIG. 10) for driving wheels 12. Two button operated switches 35 and 37 on console 31 respectively represent forward and reverse button controls for the cart. The operator need only turn the key 33 "on", press the forward or reverse button as desired and squeeze the trigger handles 16 to move the cart about the hospital floor. (Handles 16 have switches 40' (see FIG. 10) built into them which when squeezed complete the motor circuit.) Steering of course is made possible by the pivotally mounted wheels 14. Indicator light 39 glows when the battery is being charged.

A heater control logic panel 46 is shown on the front of section 44 and has three columns of push button switches. Each horizontal row of these switches represent the controls for a single tray. The first vertical column of switch buttons 48 are the "off" switches for each of the tray stations, and columns of switch buttons 50 and 52 represent the on switches for the two separate heat transfer devices which are independently operated and which are provided in each tray. Of course a different switch arrangement could be used.

In FIGS. 3 to 8, one tray to be used with the cart of FIG. 1 is shown. It will be appreciated that the cart may have any desired capacity (the cart illustrated holds about 18 trays), and the number is not a limitation of this invention. Normally all of the trays used in the cart are identical, and may be used interchangeably on any of the racks in the separate compartments of the cart.

The tray 100 illustrated in the drawing is rectangular in shape and typically may be approximately 14 × 18 inches. Preferably the dimensions of the tray are the same as conventional food serving trays now in use and they are designed so that they may be used as conventional food carrying trays without the activation of their heat transfer devices in cafeterias and other central food serving locations in the facility utilized by ambulatory patients, guest, staff etc.

The tray has an upturned rim 102 which extends about its periphery, and the main body of the tray is made of a high heat distortion, self extinguishing material such as acrylonitrile-butadiene-styrene plastic (ABS) or a copolymer of polystyrene and polyphenylene oxide. The entire exposed upper surface of the tray is made of such a material with the exception of the spot heaters that comprise the heat transfer devices which are incorporated into it, as described in detail below.

In the embodiment shown, two heaters 104 and 106 are provided in the tray, and their total areas together constitute a small percentage of the total tray area. For example, the diameter of heater 104 may be approximately 7 inches and the diameter of heater 106 may be approximately 4 inches. Of course different members and sizes of heaters may be used in accordance with this invention. In the illustrated configuration the heater 106 would normally be used to heat soup in a bowl placed on the heater, and heater 104 would be used to direct heat to food in the main dinner plate. While the diameters of the heaters 104 and 106 differ from one another, their construction is quite similar as will be evident from the following description.

In the cross sectional view of FIG. 7, the main tray body 108 which forms the horizontal support member of the tray is provided with an opening 110 whose diameter defines the size of the local or spot heater 104. A bead 112 is molded in the support 108 immediately about the opening 110, which bead defines a ring or guide for positioning a plate on heater 104 and inhibits the plate from shifting or sliding off the heater. A similar but smaller opening 109 defines the area of the smaller second heater 106, and it also is surrounded by a bead 113 for positioning a soup bowl on it. A premolded circuit assembly base 114 made of the same or a material similar to the body is secured to the bottom of support 108 and closes the openings 109 and 110. The periphery 143 of the assembly base extends radially beyond the edges of the openings, and it is essential that the base form a proper seal with the body as described in greater detail below so as to make the tray fully immersible. Water must of course be prevented from entering the interior of the heaters.

The assembly base shown is provided with a number of shallow channels 115 for receiving the electrical wiring for the two heaters. The conductors 116 are connected to electrical contact rivets 117 that are exposed on the bottom of the base so that they make contact with suitable terminals in the cart which are described in detail below.

As shown in FIG. 6, the contact rivets 117 are connected to the conductors 116 by suitable terminal rings 118 which are crimped or otherwise electrically joined to the rivets. And the tops of the rivets are peaned over the rings to ensure continued contact therewith. The upper ends of the rivets 117 are not exposed on the upper surface 120 of the tray, and if holes are provided through the body they are filled with silicone 121 or some equivalent material to seal the upper surface, as shown in FIG. 6.

The assembly base 114 together with an aluminum disc 124 defines a cavity 126 which houses the operative elements of the heater assembly. The aluminum disc is of sufficient diameter so as to extend under bead 112. A silicone or other sealant under bead 112 is used to preserve the necessary immersible character of the tray. The edge of the base 114 is similarly sealed to the main body of the tray.

The heater 104 includes three positive temperature coefficient (PTC) pellets 128 of the type manufactured by Texas Instrument Company, which are disposed in the cavity 126 and are equally spaced about the bottom of the aluminum disc to which they are bonded. The pellets may be approximately ⅝ inch in diameter and are connected in series to conductors 116' and 116" as shown in FIG. 4. The bottoms of the pellets are spaced from the assembly base 114 so as to form an air gap to prevent the base from becoming uncomfortably hot when the heaters are activated. A number of ribs 130 are provided on base 114 to maintain the gap and prevent sagging or other distortion of aluminum disc 124.

The smaller heater 106 differs from the larger heater 104 only in the number of pellets 128 used. As shown, a single pellet is sufficient to provide the heat necessary for the smaller heater. Like pellets 128 in heater 104, the single pellet of smaller heater 106 is bonded to the bottom of its aluminum disc 132 and ribs 130 serve to space that disc from the base 114 to preserve the gap.

In FIG. 1 a set up tray is shown wherein a soup bowl B is on heater 106, a dinner plate P is on heater 104, and the other normally used side dishes (dessert dish DD and bread and butter dish BD), utensils and napkin, and coffee cup CC are shown. The bowl B and plate P disposed on heaters 106 and 104 respectively may typically be those shown in Design Pat. No. D-229,812 dated Jan. 8, 1974 owned by Sweetheart Plastics, Inc. The bowl and plate may be made of thermoformed sheet material, and each preferably has a bottom wall whose contours conform to that of the aluminum discs to provide a wide face to face contact area with the aluminum discs forming the upper surface of each of the heaters. In the preferred form of this invention the bowl and plate are held in place on the aluminum discs by the beads 112 and 113 which surround them. Customarily trays made up as shown in FIG. 1 with the food, dishes, cutlery, etc. in place are assembled in the cart 10 on each of the racks in the compartments 20, 22 and 24. The angles 26 are disposed in the cart approximately 4½ inches apart so as to provide sufficient space on each angle for a set up tray. It is contemplated that when the food is dished onto the main dinner plate P and the soup is poured in bowl B, they are at the desired temperature for eating, and it is the function of the cart and tray to maintain the food at that temperature for so long as is required to deliver the food to the various patients in the institution. When the set up trays are placed on the angles which comprise the racks in the cart, the electrical connection is made between the rivet contacts 117 on the tray and the mating terminals for each rack in the cart. as shown in FIG. 9, brackets 134 are mounted in the rear of the compartments adjacent each tier as defined by the angles 26. The brackets carry four spring-type terminals 136 which equal in number the rivet contacts 117, and the terminals are positioned automatically to make electrical contact with the rivet contacts on the trays by stops 26' on angles 26 and guide 26" when the respective trays are positioned properly on their angle racks. The ribs 141 on the sides of the tray bottom ensure proper positioning of the tray on the angles in alignment with terminals. The ribs also provide a steady base for the tray by extending below the bottoms of contacts 117. The control board switches 48, 50 and 52 for each rack are connected in circuit with the terminals 136 and power supply 137 and switch 48 (not shown in FIG. 10) turns off both heaters 104 and 106, switch 50 when on causes heater 104 to become energized and the other switch 52 when on causes heater 106 to become energized. When a tray is placed on the rack the appropriate switches for that rack are actuated so as to supply energy to either or both of the heaters as desired. The loaded cart is then wheeled about the floor to the locations of the various patients where the trays are pulled from the rack individually and given to the patients. For so long as the trays remain in the cart, heat is supplied to the soup and/or entree to maintain the food at the desired temperature. Thus, unlike the prior art feeding systems, there is a continuous source of energy provided to continuously heat the food.

The PTC pellets are basically multi-modal resistance heaters. Below their critical temperature which may range from 120°F. to 400°F. depending upon composition, they have a low electrical resistance, while above it the resistance is very high. Near the critical temperature, the resistance varies between extremes. Therefore, depending upon temperature a PTC heater will deliver different wattages. If the plate or bowl is colder than intended to cool the PTC heater below its critical temperature, the heater will operate at a high wattage which will in turn quickly heat the bowl or plate on it and of course the PTC material will become hot. Ultimately the wattage will decrease and the system will come into equilibrium. At equilibrium the heater will operate at just enough wattage to keep the food warm without overcooking it.

This characteristic of PTC heaters may be utilized not merely to maintain the temperature of hot foods as described above, but also to reconstitute cold food to the desired serving temperature. A cold dinner plate for example at a temperature of 40°F. placed on heater 104 may be heated to the 140°F. – 150°F. range in less than 1 hour. Such a system thus will enable institutions to buy frozen meals from independent food preparing firms and eliminate its own cooking facilities. Essentially the establishment utilizing the system would set up the tray with cold food and after a prescribed period the reconstituted food would be delivered to the patient. It is within the scope of this invention that the cart could during the initial heating period be connected to line voltage through a transformer and then during the delivery period be switched to its own power pack.

While in the preferred form of this invention PTC pellet heaters are utilized as the heat source, it should be appreciated that other heaters may be used such as resistance heaters. Some of these are so inexpensive that they may be considered disposable, and if the tray is made of inexpensive materials, such as corrugated or low cost plastic the entire tray could be disposable. Printed circuit heaters as well as foil heaters of the type shown in U.S. Pat. No. 3,397,301 fall within the class of resistance heaters contemplated. These heaters get hot when electric current is passed through them. These heaters provide a fixed amount of heat, assuming that the voltage source is fixed. To control the heat output of resistance heaters a thermostat may be used to turn the heaters on and off at selected low and high temperature levels. Thus a resistance heater and thermostat combination may be used in place of the PTC pellets of the preferred form of this invention.

It is contemplated within the scope of this invention that each patient may himself have a special tray support which has an electrical terminal adapted to connect with the contact rivets on the tray to further energize the heaters 104 and 106 to continue to maintain the food at the desired temperature when at the patient's station. In this connection, it will be noted that in the preferred form, both the bowl B and plate P are provided with covers so as to better retain the heat generated through the introduction of heat from the spot heaters to the food.

It will be appreciated from the foregoing description that because of the localized nature of the heaters, the heat generated by them will not elevate the temperature of other foods on the tray either in separate dishes or on the tray surface 120. For example, a cup containing a cold beverage will not be warmed by the heaters, nor will the butter on the bread dish BD melt because of the generation of heat at the heaters 104 and 106. Furthermore, the dessert dish DD which may contain Jello or some other cold food will not be subjected to heat from heaters 104 and 106 and consequently the dessert will also remain at the desired temperature.

Because the heat is transmitted by conduction from the heaters to the foods in the dishes or bowls on them, little or no loss of efficiency will occur in the heating process even with the introduction of a fan or other air circulator which would prevent a build up of heat, food odors and condensation in the compartments of the cart. This circulation will assist in maintaining the lower temperatures of the other foods by preventing an increase in the ambient temperature.

From the foregoing description it will be appreciated that the advantages sought by the present invention are achieved. Of particular importance is the fact that the food may be served to the patient in conventional dishes and bowls so that the patient need not be made to feel "different". The trays themselves although internally markedly different from trays heretofore used do not have a "foreign" or strange appearance. And of primary importance is the fact that the food is served to the patient at the desired temperature. And while in the foregoing description of use of plastic dishes and plates is suggested it should be appreciated that regular chinaware or glassware may be used with equal facility, albeit the added expense of washing is introduced.

It should also be appreciated that the tray may be decorated by coloring, texturing or printing so as to make them most attractive. The aluminum discs can be porcelainized or enameled so as to match or contrast with the main tray body 108. And the heaters in no way interfere with any other functional feature that may be advantageously incorporated into the tray.

While the cart is described as having a control panel 46 with button actuated switches for the heaters, it will be appreciated that the heaters could be made to operate automatically without the usual manually operated buttons. For example, a thermostatic element could be positioned at the aluminum disc and sense the temperature of a cold or hot dish placed on the disc, and open or close the heater circuits as desired.

Because numerous modifications may be made of this invention without departing from its spirit, we do not intend to limit the scope of this invention to the embodiments illustrated and described. Rather, it is intended that the scope of this invention be determined by the appended claims and their equivalents.

What is claimed is:

1. A mobile food serving system for maintaining food at a desirable serving temperature, said system comprising a mobile cart having at least one tray supporting rack, a self-contained electrical energy source carried by and movable with the cart, a tray removably supported on the rack and having a supporting surface for food containers, at least one localized contact heat transfer device in said surface with a substantial portion of the surface free of such devices, said tray carrying electrical contacts, each localized heat transfer device comprising an electrical heater in thermal contact with a localized surface area of the tray for good heat transfer thereto, each tray heat transfer device being electrically insulated and thermally insulated from other portions of said tray so that food can be maintained heated at said localized surface area while other areas of said tray surface can carry food without heating said last-mentioned food, electrical connecting means including mating electrical contacts on said rack and a switch for supplying energy from the source on the cart to the heat transfer device on the tray surface through said tray contacts to energize said device when the tray is on the rack on the cart, and a food container arranged in direct contact heat exchange relationship with the localized heat transfer device so as to transmit heat between the device and the food contained therein.

2. A system as described in claim 1 further characterized by said food container having a bottom surface that generally conforms to the surface of the heat transfer device so that the container bottom has substantial surface to surface contact therewith, and means in the tray surface for assisting in positioning and retaining the container on the heat transfer device.

3. A system as described in claim 2 further characterized by
said tray having more than one heat transfer device,
and means operatively associated with each heat transfer device capable of maintaining the different devices at different preselected temperatures.

4. A system as described in claim 3 further characterized by
said tray being made of thermal insulating material,
and each heat transfer device in the tray being thermally insulated from other heat transfer devices in said tray.

5. A system in accordance with claim 2 wherein each contact heat transfer device is air insulated from a lower surface of each tray opposite said supporting surface of each tray.

6. A system in accordance with claim 2 wherein said last-mentioned means comprises an upstanding peripheral boss precluding lateral movement of said container.

7. A system as described in claim 1 further characterized by
said food container being made of thin sheet plastic material to enhance ease of heat transfer to food in said container.

8. A system in accordance with claim 1 wherein each contact heat transfer device comprises a positive temperature coefficient electric heating element.

9. A mobile food serving system in accordance with claim 1 wherein said tray comprises,
said supporting surface being horizontal and having an upturned edge portion,
an opening in the support generally corresponding in size to the bottom surface of a food container,
a circuit assembly base secured to the bottom of the tray and aligned with the opening,
a disc on the tray made of good heat conductive material and generally conforming in shape to the opening and aligned with the opening, said disc and base forming a closed cavity in the tray,
said heat transfer device being in contact with the bottom of the disc and with its bottom spaced from the base and lying in the cavity,
and the electrical tray contact connected to the heat transfer device by conductors in the cavity for carrying energy to the device to energize it.

10. A mobile food serving system for maintaining food at a desirable serving temperature, said system comprising
a mobile cart having a plurality of tray supporting racks, a self-contained, rechargeable electrical battery carried by and movable with the cart,
a plurality of trays being removably supported on the racks and each having a surface for carrying food,
a plurality of localized contact heat transfer devices arranged in said surface of each tray when the trays are mounted on the racks,
said trays each carrying electrical contacts,
each localized heat transfer device comprising an electrical heater in thermal contact with a localized surface area of the tray for good heat transfer thereto,
each tray heat transfer device being electrically insulated and thermally insulated from other portions of said tray so that food can be maintained heated at said localized surface area while other areas of said tray surface can carry food without heating said last-mentioned food,
electrical connector means including mating cart electrical contacts for contact with said electrical contacts of said trays and a switch for connecting the devices and the battery, said electrical connector means further including means for energizing preselected ones of said trays.

11. A food serving system as described in claim 10 further characterized by
said devices being embedded in the tray surfaces and the trays being made of a thermal insulating material,
and at least one food container on each tray in contact heating relationship with one of said contact heat transfer devices.

12. A food serving system as described in claim 11 further characterized by
means operatively associated with each device for retaining the temperature of food in containers on said devices at a preselected level.

13. A system as described in claim 11 further characterized by drive means for propelling said cart,
said drive means being powered by a self-contained electrical energy source,
and control means for actuating and deactuating said drive means.

14. A system as described in claim 13 wherein said trays and food container are formed of an organic plastic.

15. A system in accordance with claim 11 and further comprising,
means for retaining said trays on said racks,
said electrical connector means further including mating electrical contacts on said trays and said racks and means for urging said contacts into resilient engagement with each other.

16. A food serving system as described in claim 10 further characterized by
single service food containers having bottom surfaces that generally correspond in size and shape to the surfaces heated by said heat transfer devices and removably placed on the devices,
and a cover sized to fit the containers.

17. A system in accordance with claim 10 wherein each contact heat transfer device comprises a positive temperature coefficient electric heating element.

18. A mobile food serving system comprising
a mobile cart for movement about the floor of an institution such as a hospital and controlled by a single operator,
a self-contained, rechargeable, low voltage power pack on and movable with the cart,
an array of racks for food serving trays arranged in a column on the cart,
electrical terminals for each rack on the cart and connected to the power pack,
a plurality of substantially identical food serving trays fitting on and removable from the racks, said trays being made of thermal insulating material and each having a supporting surface to carry a plurality of food containers that constitute the dinnerware for a single person,
at least one localized contact heater in each tray supporting surface providing a source of heat over a finite area that comprises a small portion of the entire surface so as to leave a substantial portion of the surface unheated so that it may carry containers with food not to be heated, said trays being formed of insulating means for thermally insulating said heaters to allow contact heating of said finite area while permitting other containers to remain unheated, means carried by each tray for connecting its localized heaters to a terminal when the tray is placed on a rack so as to connect said heaters to said power pack, means associated with each heater for maintaining the food in the containers in contact with the heaters at a preselected temperature level, and a plurality of individual food containers carried on and removed at will from the tray surface with at least one container on a localized heater, said one container being made to conduct heat from the heater to the food within it, said one container having a removable cover.

19. A food serving system as described in claim 18 further characterized by said heaters in the trays being sealed so that the trays are immersible.

20. A food serving system as described in claim 18 further characterized by a plurality of switches electrically connected to the heaters and power pack to maintain different heaters at different preselected temperatures when desired.

21. A food serving system in accordance with claim 20 wherein a second contact heater is positioned in each tray at a second finite area of each tray.

22. A food serving system as described in claim 18 further characterized by said racks supporting the trays in spaced apart relation to one another, and said means carried by each tray being electrical contacts extending downwardly from the bottom surfaces of the trays, and said terminals being mounted in the racks for automatically engaging the contacts when the trays are mounted on said racks.

23. A system as defined in claim 14 further characterized by said cart being open on one side to provide access to the column of racks from the open side thereof, said terminals being disposed in the racks remote from the open side thereof, and drive means connected to said power pack which acts to cause movement of said cart.

* * * * *